(12) United States Patent
Weaver (10) Patent No.: US 9,499,282 B1
(45) Date of Patent: Nov. 22, 2016

(54) PORTABLE AIRCRAFT STAIRS AND METHODS

(71) Applicant: Leslie D Weaver, Palm Beach Gardens, FL (US)

(72) Inventor: Leslie D Weaver, Palm Beach Gardens, FL (US)

( * ) Notice: Subject to any disclaimer, the term of this patent is extended or adjusted under 35 U.S.C. 154(b) by 0 days.

(21) Appl. No.: 14/545,716

(22) Filed: Jun. 9, 2015

Related U.S. Application Data (60) Provisional application No. 61/997,988, filed on Jun. 16, 2014.

(51) Int. Cl.
*E01D 1/00* (2006.01)
*B64F 1/315* (2006.01)

(52) U.S. Cl.
CPC .................................. *B64F 1/315* (2013.01)

(58) Field of Classification Search
CPC ...................................................... B64F 1/315
USPC ........ 14/69.5–71.3, 71.7, 72.5, 78; 187/201; 104/165, 229, 241, 288
See application file for complete search history.

(56) References Cited

U.S. PATENT DOCUMENTS

| | | | | |
|---|---|---|---|---|
| 3,749,202 A | * | 7/1973 | Puls | B66B 9/083 182/103 |
| 3,833,092 A | * | 9/1974 | Flinchbaugh | B66B 9/0823 187/201 |
| 4,171,023 A | * | 10/1979 | Sturges | E02F 3/80 172/292 |
| 4,345,669 A | * | 8/1982 | Noall | B66B 9/083 182/103 |
| 4,438,830 A | * | 3/1984 | Born | B66B 9/083 187/201 |
| 4,564,086 A | * | 1/1986 | Kingston | A61G 3/063 182/37 |
| 4,627,517 A | * | 12/1986 | Bor | B66B 9/083 187/201 |
| 4,904,916 A | * | 2/1990 | Gisske | B66B 9/083 182/2.9 |
| 4,913,264 A | * | 4/1990 | Voves | B66B 9/08 187/201 |
| 5,050,708 A | * | 9/1991 | Wood | B66B 9/0838 187/201 |
| 5,105,914 A | * | 4/1992 | Holden | B66B 9/0846 187/201 |
| 5,193,650 A | * | 3/1993 | Kent, Jr. | B66B 9/083 187/201 |
| 5,217,089 A | * | 6/1993 | Virk | B66B 9/083 187/201 |
| 5,319,818 A | * | 6/1994 | Baranowski | A61G 3/061 14/71.1 |

(Continued)

OTHER PUBLICATIONS

Stair Lift Help Guide by Ameriglide Stair Lifts, 10 Pages, Advertisement Guide illustrating a number of "Stair Lift" products. Shown on Internet Explorer as of Jun. 8, 2015—http://www.ameriglide.com/AmeriGlide-Stairlifts.htm.

*Primary Examiner* — Raymond W Addie
(74) *Attorney, Agent, or Firm* — R. M. Saccocio (57) ABSTRACT

A seat platform is driven up and down a foldable track by a trolley connected to electro-mechanical means to allow passengers to embark and to disembark from an aircraft. No stairs are used. The seat platform can be rotated to enable easy access onto and exiting by a person. The seat platform is adapted to fit a person, with or without disabilities, or accommodate a relatively large or heavy package, or luggage for transfer of the person or package from the tarmac of an airfield to the inside a plane and vice versa. The seat platform is adapted to ride on a set of tracks of sufficient strength to prevent twisting and inadvertent removal of the trolley from the track. The invention further includes positive break apparatus to prevent a runaway seating platform from occurring. After the embarking is completed, the lift apparatus can be dissembled, the track folded upon itself and all of the disassembled components can be securely stored on the aircraft. Upon arriving at the flight destination, the stored lift apparatus can be reassembled to allow passengers to exit safely from the plane and thereby providing passengers with the advantage of entering and exiting a plane without the use of stairs.

14 Claims, 5 Drawing Sheets

(56) References Cited

U.S. PATENT DOCUMENTS

| | | | | |
|---|---|---|---|---|
| 5,476,155 A * | 12/1995 | Nakatani | ............... | B66B 9/0853 187/201 |
| 5,499,419 A * | 3/1996 | Baranowski | .............. | E01C 9/08 14/69.5 |
| 5,887,540 A * | 3/1999 | Krish, Jr. | ................ | B60R 3/005 114/362 |
| 6,360,833 B1 * | 3/2002 | Valencia | ................ | A61G 5/061 180/7.5 |
| 6,854,147 B1 * | 2/2005 | Ahlsten | ................... | B64D 9/00 14/69.5 |
| 7,185,741 B1 * | 3/2007 | Rozenfeld | ............. | B66B 9/0869 187/200 |
| 8,146,713 B2 * | 4/2012 | Rosenthal | .............. | B66B 9/083 187/200 |
| 2005/0150064 A1 * | 7/2005 | Hill | ....................... | B63B 27/143 14/71.1 |

* cited by examiner

PORTABLE AIRCRAFT STAIRS AND METHODS

Applicant and inventor Les Weaver, under 35 U.S.C. 119f claims the benefit of his earlier provisional application filed on Jun. 16, 2014, Ser. No. 61/997,988 entitled Lift Apparatus and Methods

FIELD OF THE INVENTION

This invention relates in general to the field of lifting apparatus and in particular to the field of lifting a person, thing, baggage or any weighted item from the ground to a door of an airplane by using electro-mechanical apparatus.

Problem Existing in the Prior Art

There exists a problem in the prior art with airplanes where the entrance door is a substantial distance above the ground but not sufficiently high enough to be able to utilize a loading ramp. A typical large plane loading ramp connects between a door of the terminal and the door of an aircraft such that a relatively level passageway is provided from the airport terminal to the door of an aircraft. The latter device is generally used with large commercial airplanes, for example a 727, an air bus, etc.

There are a group of smaller planes such as a G650 Gulfstream, an Embraer Legacy to name just a few, which have stairs that are built within or mounted onto the door structure such that the stairs unfold when the aircraft door is opened. Such stairs extend from the aircraft door to the tarmac thereby allowing passengers to embark or disembark from the aircraft. For safety sake there is a usually a railing on both side of the stairwell. Between the railings and the stairs themselves, a person carrying a carry on suitcase or even a briefcase up the stairs can have a difficult time in negotiating the stairs. For example, the baggage can bump into the stairs and or the railings making going up or down the stairs a difficult maneuver.

However, stairs that are built within a door of a plane is a clever method of providing means that are carried within a plane so that passengers can embark the plane at its origin and disembark at its destination; that is, provided that the passenger is physically able to negotiate a set of stairs and is not carrying baggage. Then too not all large planes have such built in stairs most probably because the tarmac is too great of a distance to the plane's door and it is desired to exit on the tarmac. In such a situation potable stairs that can be rolled up to the aircraft is the prior art alternative. However, portable stairs have the same disadvantages as an aircraft's stairs built within the door of the aircraft.

Passengers with physical disabilities, who are wheel chair bound simply cannot use an aircraft's built in stairs. So too passengers with other disabilities or heart conditions or aged persons who don't have the strength to negotiate stairs is a serious problem in the prior art. Physically carrying a disabled person up the stairs and onto the plane is not a feasible solution.

Disembarking from an aircraft at its destination point involves essentially the same passenger problems as at the origination airport, and perhaps even more so. For example, a physically able passenger carrying a carryon or even a small package will have more difficulty going down the stairs and preventing himself from tripping or falling down the stairs. Any baggage will usually be held in front of the passenger thereby blocking his view of the stairs which can lead to an unfortunate accident What is needed is apparatus to lift passengers, whether disabled or not, and or cargo safely into and out of a plane; further, the lift apparatus should be portable and be able to be disassembled and stored on the plane for use both at its origination and at its destination. The present invention accomplishes these goals and overcomes deficiencies in the prior art and more by providing apparatus and a method to safely and conveniently enable persons with or without disabilities to board a plane from the tarmac to a plane's door which is above the tarmac. Also, the apparatus of the present invention is portable and can be stored on the plane.

SUMMARY OF THE INVENTION

The present invention comprises portable lift apparatus for use with an aircraft which can be rapidly and easily assembled and dissembled and when dissembled can and stored on a plane during flight. The inventive apparatus does not require any changes to the door or the stairs built within the door of the aircraft. Other important aspects of the present invention is that the aircraft does not need to modified, that the invention does not interfere with the plane's air worthiness, or require approval and or inspection by an overseeing governmental agency.

In general, the invention herein comprises a seat platform which is driven up and down a foldable track by a trolley connected to electro-mechanical means. No stairs are used. The seat platform can be rotated to enable easy access onto and exiting by a passenger. The seat platform can be adapted to fit a person, with or without disabilities, or accommodate a relatively large or heavy package, or luggage for transfer of the person or package from the tarmac to inside the plane and vice versa. The invention herein further includes safety apparatus to prevent a runaway platform from occurring. The seat platform is adapted to ride on a set of tracks of sufficient strength to prevent twisting and inadvertent removal of the trolley from the track. After the embarking is completed and any and all cargo is loaded on the aircraft, the lift apparatus can be dissembled, the track folded upon itself and all of the disassembled components can be securely stored on the aircraft. Upon arriving at the flight destination, the stored lift apparatus can be reassembled to allow passengers to exit safely from the plane and thereby providing passengers with the advantage of entering and exiting a plane without the use of stairs.

DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description operation, and advantages of the invention.

Figure 1:
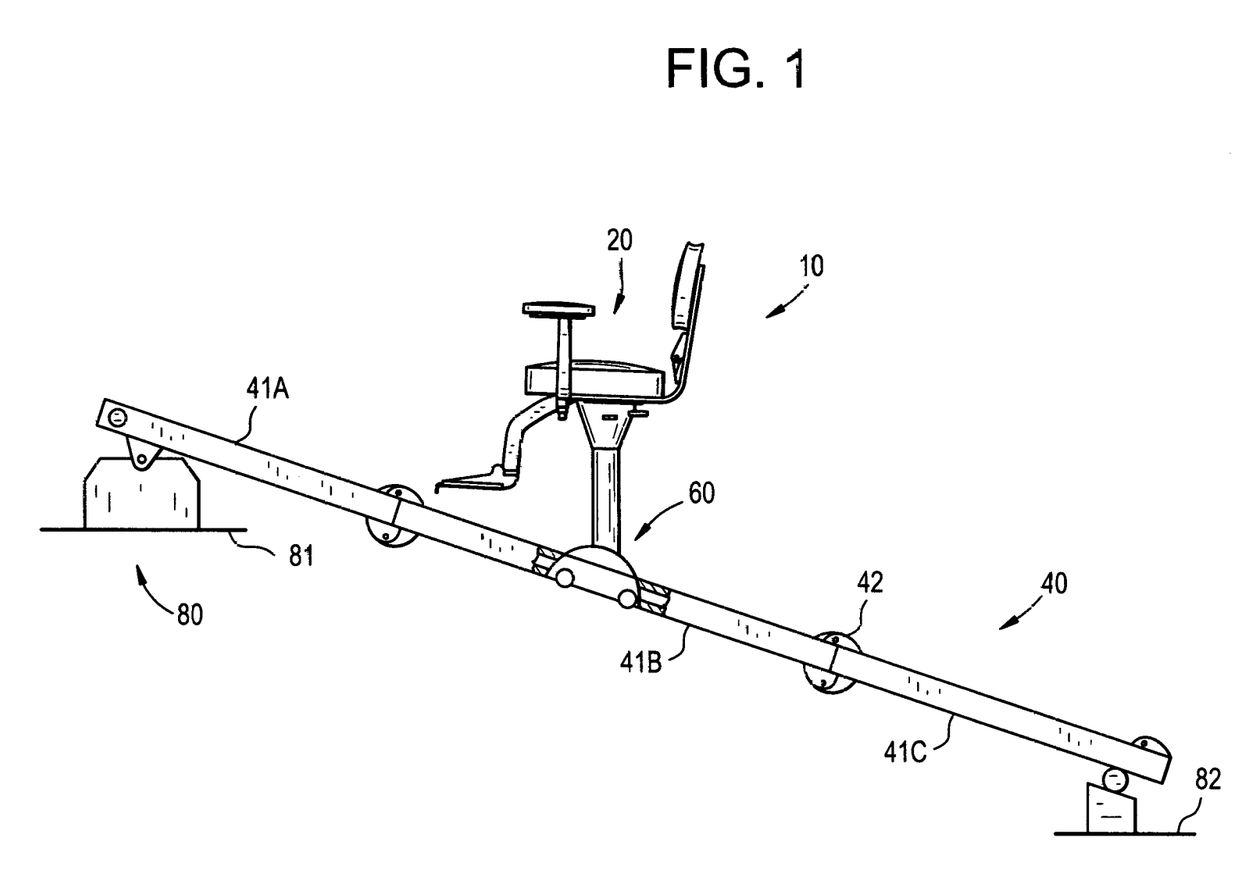
FIG. 1 depicts the major components of the invention as they are connected to each other when the lift apparatus is positioned for operation.

Referring now to the drawings, FIG. 1 depicts a two dimensional composite view of the assembled major components of the inventive lift apparatus as it is assembled for operation. The unique hinges connecting the individual track portions are clearly shown in this figure.

A complete arrangement of the invention 10 includes: seating apparatus 20, including foot support apparatus; trolley apparatus 60; track apparatus 50; and, power apparatus 80. One important object of the invention is compactness in that all of the invention's components can be assembled at the location of the plane, then after boarding is finished they can be dissembled and stored on the plane. Upon arrival at the destination of the aircraft, the lift apparatus can be removed from the plane and reassembled for passenger disembarking. Other important objects are is that no structural modifications of the aircraft are required nor does the invention affect the plane's air worthiness.

The lift apparatus 10 only makes contact with the plane's interior deck 61 by the power apparatus 60 so as not to touch or damage the plane's door frame (not shown). If the aircraft is fitted with stairs that unfold when the door is opened, the same does not hinder the assembly or the operation of the lift apparatus or the use of the built in stairs when the inventive lift apparatus is not used.

Figure 2:
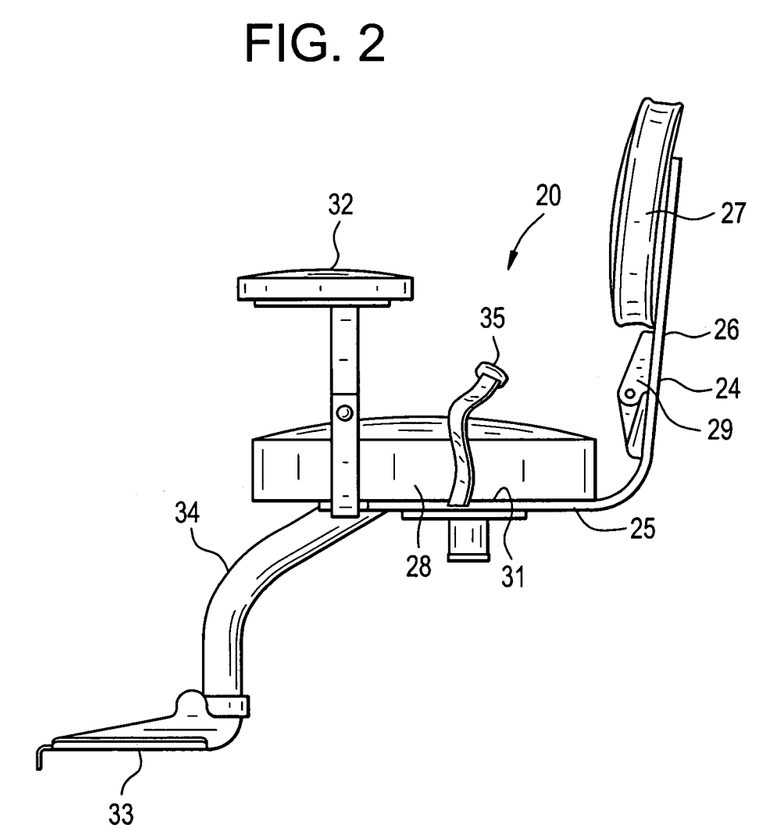
FIG. 2 illustrates a typical chair assembly that can be used with the track apparatus of the invention which provides for a passenger to sit thereon when boarding or disembarking from an aircraft.

The seating apparatus 20, shown more clearly in FIG. 2, can comprise a frame 24 that can consist of an elongated metal strip bent at approximately 90 degrees such that the horizontal portion forms a seat support 25 and the vertical portion 26 forms a support for a padded or unpadded backrest 27. The seat support 25 can include a seat pad or cushion 28 for passenger comfort. An unpadded cushion will equally be satisfactory. The seat pad 28 and the back rest 27 can be removably attached to the seat frame 24. The back of the backrest 27 and the bottom of the seat pad 28 can include relatively stiff backing for firm attachment to the backrest support 26, and seat support 25, respectively. It is preferable that the backrest support 26 include hinge apparatus 29 so that it can be folded against the seat support 25 or against the seat cushion 28 for compactness. A flat seat platform 31 having the approximate size of the seat pad 28 can be interposed between the seat support 25 and the seat cushion or pad 28. In this manner removal of the seat pad 28 provides a flat platform.

The seat assembly includes a pair of arm rests 32 which can extend up from the bottom of the seat frame 25 or can extend around the backrest and then forward toward the seat cushion. The upwardly extending arm rests can be positionable upward or downward and be removed from the seat cushion, or if arm rests that extend around the back pad are used, they can be rotated to a vertical position in alignment with the vertical sides of the back rest. In either event compactness is obtained when the backrest 26 is folded down.

Again for passenger comfort and safety, a foot rest 33 extending down from the seat support 25 can be provided. The foot rest 33 can rotated to a flat position up against the supporting arm 34 that extends downward from the seat support 25.

In addition to compactness, the advantages of folding down the backrest 26 include using the seat assembly 20 as a cargo and or baggage lift. For example the cargo may consist of luggage or sundry packages of regular or irregular sizes consistent with the size of the seat assembly 20 and not being interfered with by a vertical backrest. The relatively level platform created by the seat apparatus 20 allows for ease of strapping the cargo down.

Since one of the main objects of the invention is to be able to store the lift apparatus 10 on the plane when not in use so that it can be setup and used wherever the plane is located, i.e. at its originating location or its destination location. In the present invention the seat assembly 20, including the foot rest 33, is made rotatable and removable by use of a substantial supporting shaft 35 that fits within a substantially vertical pedestal 36.

And of course the seating apparatus can be plush or minimal as desired, and since the seating apparatus 20 is removable, a multitude of equivalent seat configurations can be provided. For example the seat can include a lumbar curved back, side thigh pads, form fitting shoulder pads and other like features. Another desirable feature comprises the variable height of the back rest and its position relative to a passenger. A longer and higher back rest provides additional stability to the passenger. A rack and pinion or a simple lockable slip joint can be used to either raise or lower the backrest.

To prevent a passenger from falling off the lift when it is in operation, seat belts 36 of various varieties can be used to securely hold the passenger on the seat. A simple three way auto seat belt is satisfactory, as are air plane lap seat belts. The belts can be anchored to the bottom of the seat frame. However, an auto racer type of seat belt would be most useful when the passenger is incapacitated or otherwise unable to have complete control over his body.

The bottom 31 of the seat support 25 includes an extending shaft 34 that is attached to the seat bottom 31 such as by bolts or welding. A foot rest 33 is pivotally attached to the free end of the shaft 34 so that it can be pivoted up against the extending shaft. The foot rest can take many shapes from a flat platform to a bar horizontally attached to the extending shaft. The pivoting aspect provides for compactness when the lift apparatus is stored within the plane. A simple spring loaded stop lug or spring or other well-known apparatus can be employed to maintain the foot rest in the down or up position.

In the embodiment shown, the extending shaft 34 allows the foot rest 33 to be positioned ahead of the seat support 25 and cushion 28 thereby allowing the passenger to assume his or her natural seating posture with the passenger's feet placed out in front of his or her body. The shaft 34 and the foot rest 33 are positioned along the axial center of the seat assembly 20 and do not interfere with a passenger's legs. The foot rest can include side flanges to help keep the passenger's feet within the confines of the foot rests. A rubberized covering on the foot rest further helps maintain the passenger's feet in place As an alternative to the curved extending shaft, a straight box beam, or the like, connected at an appropriate angle to the seat support 25 can be used. Other structural designs can also be used. Compactness is a primary object of the design of the seat's extending member and foot rest. Pivoting of the foot rest 33 in an up position allows a person using the lift apparatus to effortlessly climb onto the seat and when climbing off the seat. Basically, the pivoting feature in addition, to the afore described compactness, prevents a person from being interfered by the foot rest when the person is trying to negotiate onto and off the seat.

If the lift apparatus 10 is to be used as a cargo lift, the cargo can be simply placed on the seat platform 31, or the cushion 28, or on the backrest support 26 when it is rotated in the down position. The lift apparatus 10 can then be lifted to the plane's door where an attendant removes the cargo. For this procedure, the foot rest is preferably in the upward position. Since the seat cushion (if provided) is removable various structural combinations of cages or boxes or ropes can be used with the seat platform 31 to prevent the cargo from falling off the platform when the cargo is being lifted.

The apparatus that provides for the up and down travel of the seat includes a track arrangement 40, a trolley 60, and a portable power unit 80. See FIGS. 1, 4, 5, and 6. The trolley apparatus 60 is interposed between the seat assembly 20 and the track arrangement 40. The portable power unit 80 can be removably attached to the track arrangement 40, while the trolley 60 is configured to ride up and down the track arrangement 40. The trolley 60 is removably attached to the seat assembly 20 and the track arrangement 40 but is prevented from unintentional disengagement. A belt (see FIG. 5) is attached to the trolley 60 and to a pulley or a spool connected to the power unit 80. The power unit's directional motion can be engaged in a forward and a reverse direction that allows the seat assembly, and the passenger, to move up and down the track arrangement 40 while either embarking or disembarking the passenger.

Figures 3, 4:
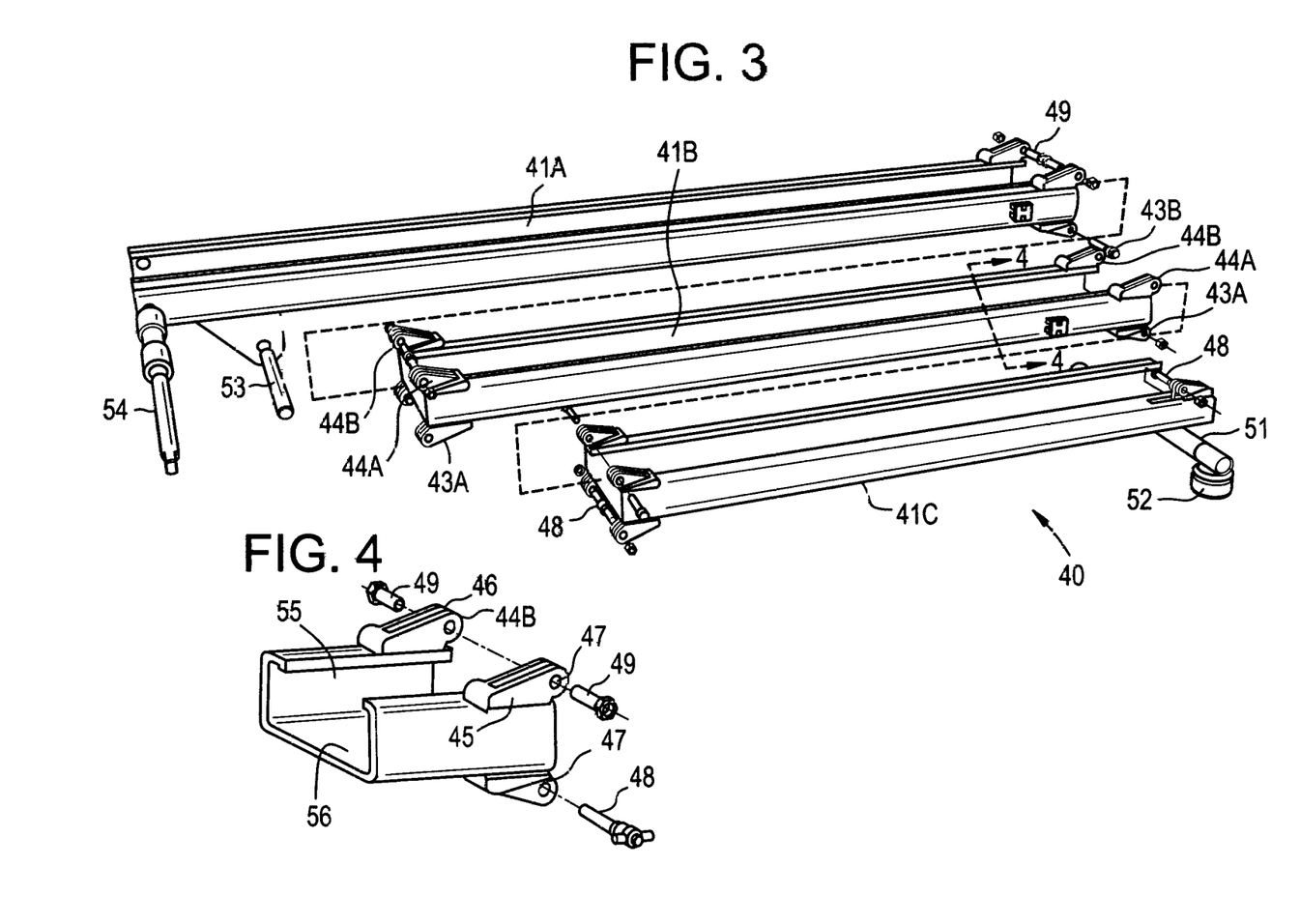
FIG. 3 shows the inventive tracking that is used with the present invention. In this figure, the component parts of the track are shown separately to illustrate the hinges that give the track the ability to fold upon itself for storage aboard the aircraft.
FIG. 4 shows a typical cross section of the track.

Referring now to FIG. 3 there is shown therein the details of the track arrangement 40. Since the track itself ill is relatively long, i.e. long enough to reach from the tarmac to the aircraft door, the track assembly 40 as shown comprises three individual portions or components 41A, 41B, and 41C. In FIG. 3 the track portions are shown separately with phantom lines indicating how and where each track portion of the track assembly is to be joined to an adjacent track portion when the lift apparatus is put in use. While FIG. 3 shows three track portions, the invention is not to be limited thereby. One or more track portions can be used. If only one track portion is to be used, the aircraft must accommodate storage of the one track component.

When two or more track components or portions are to be used, the two components must be provided with means to join the two and it is preferable that the joinder allow for the two or more components to fold against each other while being at least partially attached.

Since it is preferable that when the track components are joined together for use, the joinder is to be stable and provide a minimum of flexing. Excessive flexing will instill fear in the passenger as he or she travels up or down the lift. And it can adversely affect the movement of the trolley 60 as it attempts to travel over the joint.

A simple hinge or two of the common variety (such as a door hinge), even if made with precision, will not provide the necessary stiffness of the track joints to minimize bending of the track when the flight lift is in operation. FIG. 3 shows one satisfactory design of the hinged tracks. Interlocking hinges 42 (FIG. 1) are used on the ends at the bottom of the tracks and on the ends at the top and bottom sides respectively, of the tracks. Each half of the interlocking hinges 42 comprises two components 43A and 43B (attached on the underside of the track); while, the two components 44A and 44B are attached to the upper side of the track. This arrangement allows for four (4) interlocking hinged when two adjoining tracks are attached to each other at the adjoining end of each track section.

Each hinge component 43A, 43B, 44A, and 44B includes a plurality of plate like members 45 having spaces 46 there between which are in line with the longitudinal axis of the tracks. When the two hinge halves, e.g. 43A AND 43A at the adjoining ands of a connected track, are axially joined, the plate like members 45 of one hinge half fit within the spaces 46 of the other hinge half, then the two hinge halves are locked together by a bolts and nuts that fit within aligned openings 47 in each hinge half. When all of the interlocking hinge halves of one track are interlocked and bolted to the interlocking hinge halves of an adjoining track, virtually no bending or flexing of joint occurs. It is to be noted that the bolt and nut at the bottom hinges 43A and 44A can comprise a through bolt 48 having a nut at each end.

However the top bolts 49 only go through the width of each of the top interlocking hinges 43B and 44B leaving a space 55 between the upper flanges 56. Such space 56 allows the trolley 60 to pass adjoining joints of the By removing the locking bolts 49 from the interlocking hinges on the top of each track, the adjoining tracks can be rotated 180 degrees so as to fold one track against the other, thereby minimizing the axial length needed to store the track on the plane. In this configuration, track 41C will form one outside and track 41A will form the opposite outside of the folded over tracks.

Track 41C which is arbitrarily designated as the track that is to rest on the tarmac, includes an upper pair of hinge halves 43B. 48track 41C. A through bolt or shaft 48 is fitted across the track and through an aligned opening 47 in hinge halves 44B members 50. As more fully explained below this feature prevents the trolley 60 from disengaging from the track at the tarmac end thereof.

Also at the tarmac end of designated track 41C, a support member comprising an elongated bar or a round rod 53 is provided on the underside of track 41C. Support member 53 is oriented transverse to track 41C and is intended to but not limited to: spread the load applied to the tarmac; to stabilize the track assembly 40 when the lift apparatus 10 is in use; and, to vary the height, if necessary, of the end of track 41C by use of removable members 52.

The top end of what is arbitrarily designated as the upper track 41A is provided with a rod or pin 53 that allows the trolley 60 to be connected to the track assembly 40. The trolley 60 which as explained in part in the description of FIG. 1 serves to move the seating apparatus 20 up and down the tracks 40 by a strap connected at one end to the power module and at its other end to the trolley. Another rod 54 is provided close to the top at the underside of track 41A to allow the removable attachment to the power module 80 also described in part FIG. 1.

FIG. 4 is a cross sectional view of the track 41B and is typical of all track sections or portions. The hinge halves 44B are shown along the sides of the track; while hinge halves 44A are seen at the bottom of the track. The through bolt 48 is seen at the bottom of the track. The top bolts 49 only go through the width of the top hinge halves in order to leave an opening 55 between the inwardly extending flanges 56 and the track itself. The purpose of the opening 55 and the flanges 56 are to the fit the trolley therein and prevent the wheels of the trolley (shown in phantom) from inadvertently disengaging from the track. The cross section of the track must have a significant moment of inertia to prevent the track from twisting when the lift apparatus is in use with a passenger on the seat. The correct or sufficient moment of inertia can be determined by well-known testing and or calculation techniques.

Figure 5:
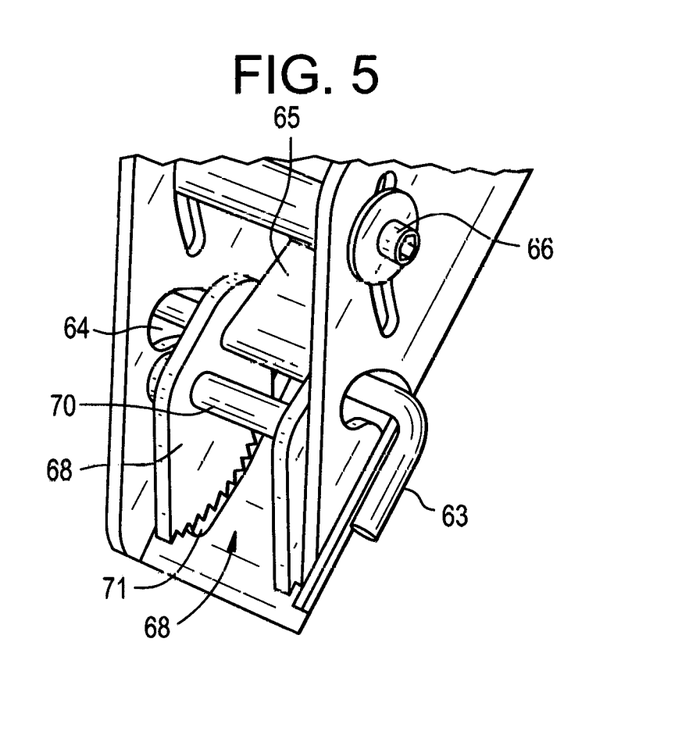
FIGS. 5 and 6 illustrate the trolley assembly that connects the chair to the track and further illustrates the over the center cam locking brake and the teeth thereon.

FIG. 5 illustrates the trolley assembly that is used to move the chair (FIGS. 1 and 2) up and down the track assembly 40. A pair of plates 61 having an arbitrarily triangular shape are spaced apart consistent with the opening 55 in track 40. Wheels 62 are provided at the bottom ends of plates 61. Wheels 62 fit within and ride along the opening 55 in track 40. The inwardly extending flanges 62 of track 40 prevent the wheels 62 of the trolley 60 from inadvertently disengaging from the track 41.

A rod or pin 63 removably fits within opposite openings 64 in plates 61. Rod 63 is removably connected to a strap 65 at one end thereof. Strap 65 is connected at its other end to the power module 80 for movement up and down track 40. Another rod or shaft 66 provides for the removable attachment of chair assembly 20 to the trolley apparatus 60 via the pedestal 67. It is to be noted that chair assembly 20 can rotate within pedestal 67 and then locked in the rotated position by the detent 36 (FIG. 2) which also serves to remove the chair assembly 20 from the trolley pedestal 67.

Figure 6:
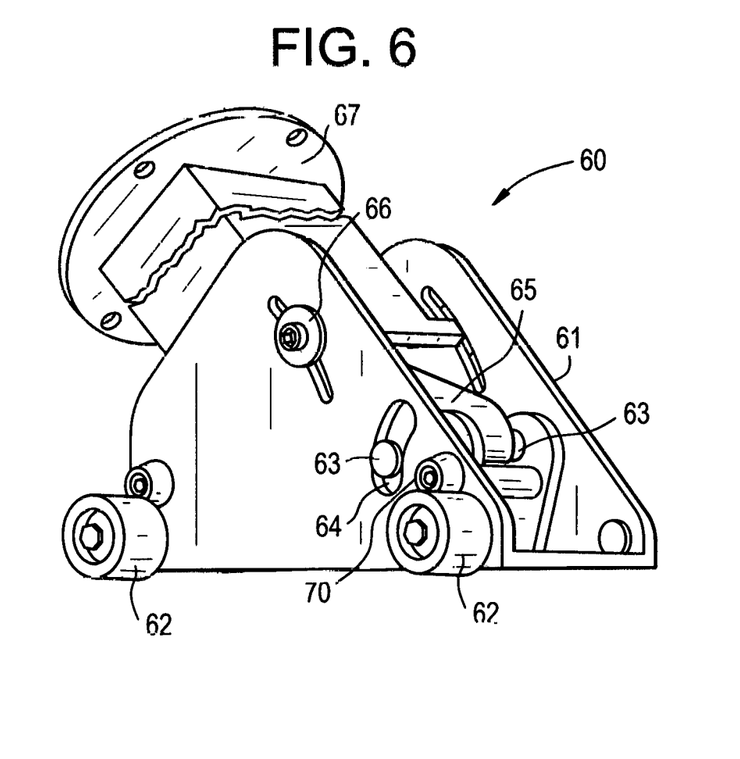

FIG. 6 shows the unique arrangement used to prevent a runaway chair with a passenger on board. The reason for the runaway is immaterial to the invention but the prevention of the same is material. The trolley mechanism securing the strap 65 to the trolley 60 includes over the center rotatable apparatus 68. The rotatable apparatus comprises two discs 68, each having sharp teeth 69 along the bottom of the discs. The discs 68 are separated from each other by the width of strap 65 but fit within the plates 61 and are essentially parallel to the plates 61. The rod holding the strap 65 is positioned behind the rotatable center of discs 68. Should the strap 65 break or otherwise come loose from rod 63, or from power module assembly 80, the discs 68 will rotate about shaft 70 causing the teeth 69 which now protrude from the openings 71 in the bottom of the trolley 60 and dig into the track 40. The more the trolley tries to move downward, the more the teeth 69 dig into the track 40 and thereby positively stop any further unwanted downward motion of the trolley and the chair connected thereto. Normal upward motion of the trolley and the seat and the controlled downward motion of the same do not cause the teeth to engage the track 40. If there is no tension applied by the strap such as when the trolley is at the bottom of the track a small spring prevents the discs from engaging the track 41.

Figure 7:
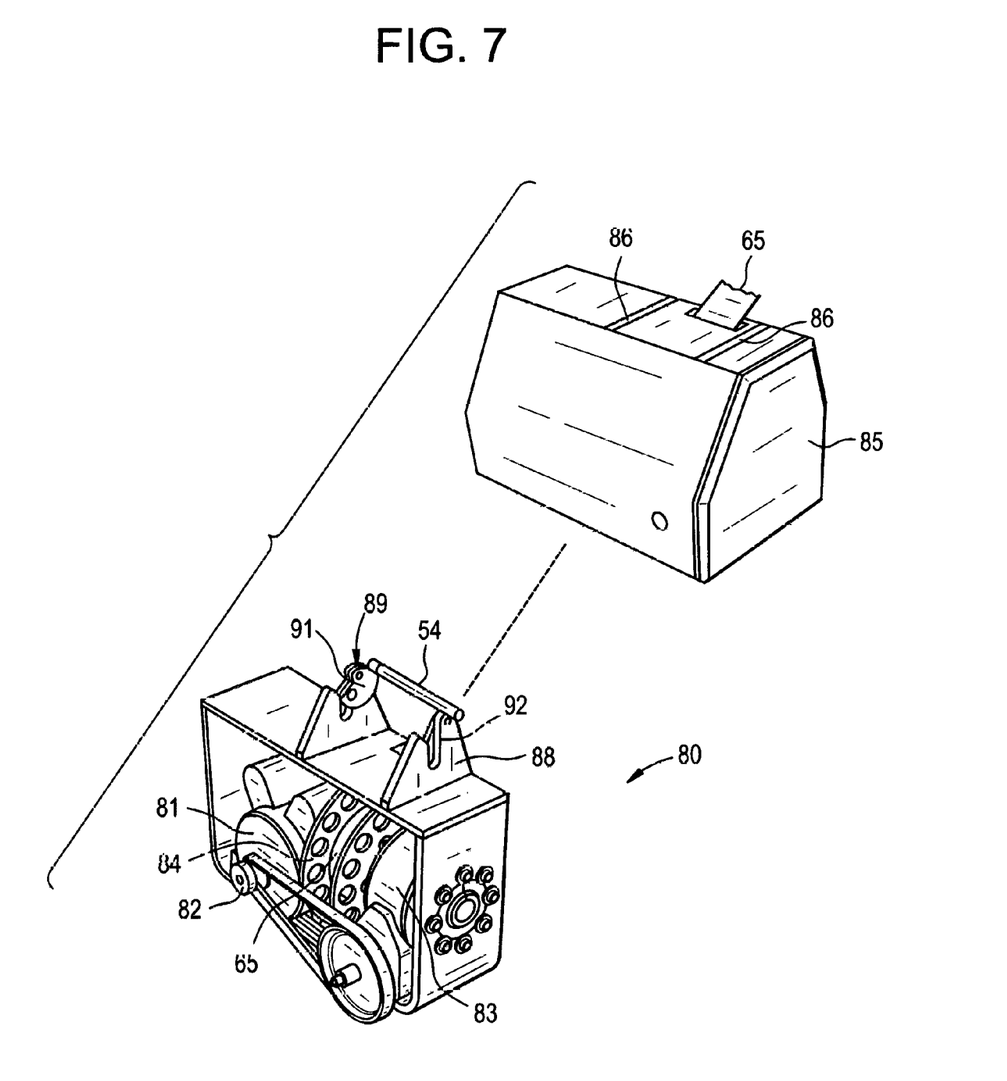
FIG. 7 shows the power assembly that is used in the invention to drive the chair apparatus up and down the track assembly when the invention is adapted to fit to a door opening on an aircraft for boarding and disembarking passengers onto and off an aircraft.

FIG. 7 is a composite drawing of the power module 80 of the lift apparatus 10. The power module can be battery powered or powered by an electrical cord connected to a voltage supply on the aircraft or on the terminal. The power module comprises an electric motor 81 connected to a pulley 82 and to a gear reduction 83 to reduce the speed of rotation. Gear reduction 83 is in turn connected to a spool 84 around which a strap 85 is wound. Strap 85 pulls the chair assembly with or without a passenger, up the track 40, and when the rotational direction of spool 84 is reversed, the strap 85 allows the chair assembly to move down the track 40 for disembarking a passenger. The free end of strap 85 is connected to the shaft 63 of the trolley assembly 60 (FIG. 6)

A cover 86 for the electro mechanical apparatus of power module is also shown in FIG. 7. Two slots 87 are provided in the top portion of cover 86. Slots 87 allow connection plates 88 to extend up through slots 87 and rise above the top surface of cover 86. A cam locking apparatus 89 comprising a bar 54 is connected to a pair of spaced locking cams 91 that operate in conjunction with the vertical openings 92 in extending plates 88. The cam locking apparatus 98 is connected to extending plates 88 after the cover 86 is placed over the electro mechanical devices within the power module 80. When the cam locking device 89 is rotated to unobstruct the openings 92, the cam locking shaft 54 (FIG. 3) is inserted within openings 92 and the bar 90 is rotated to allow the locking cams 91 to also rotate and lock the locking shaft 54 thereto. At this point, the track 41 is lockingly attached to the power module 80. Rotating the bar 90 in the opposite direction releases the power module 80 from the rack 41. The power module 80 is intended to be placed inside of the aircraft's door and on the floor thereof. Such position allows the seat to be rotated to allow a passenger to embark onto the aircraft and vice versa. Placing the power module 80 under the upper portion of track 41 prevents the power module 80 from being an obstacle to the passenger and to the operation of the lift apparatus 10.

Method of Operation

In accordance with the above description and drawings, the method of operation of the invention is as follows:

One or more persons desiring to board an air craft such as a G650 Gulfstream must use stairs to reach the passenger door. In the prior art, the stairs were built into the passenger door which unfolded as the door was opened. The prior art stairs are not conducive to a disabled passenger. The present invention overcomes this disadvantage by providing portable stairs that includes a seat that is powered up a track and onto the aircraft. A disabled person can use such apparatus. Thus, the passenger sits in the seat which is at the level of the tarmac, rides up the track and leaves the seat when the seat is at the location of the passenger door.

The apparatus includes a seat, a track, a power device and a trolley that is connected to the seat by a strap. Each component is removable from the component to which it is operationally attached during use. When not in use each component is detached from each other. The track is specially hinged so that it can be folded upon itself to reduce its length. Then the disconnected components are stored on the aircraft so that it again be used when the aircraft reaches its destination. Then the reverse of the above is accomplished so that the passengers are able to disembark from the aircraft by descending the seat and passenger down the track.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the description of the invention and the drawings here appended.

I claim:

1. A method for lifting one or more passengers from an airport's tarmac to and within a door of an aircraft including:
assembling lift apparatus at an approximate location of the aircraft's door, including:
removably connecting upper and lower interlocking hinges of at least two axial sections of a track apparatus to form a single track having a length that spans the distance between the aircraft's door and said tarmac;
removably fitting a trolley device to said single track said trolley device being movable along the length of said single track,
removably attaching seating apparatus to said trolley device;

removably attaching a power source to said trolley device by a flexible strap;
seating said passenger onto said seating apparatus;
activating said power source whereby said trolley device and said seating apparatus and said passenger are pulled up said formed single track the tarmac to the plane's door; and,
noninvasively attaching said formed single track to said aircraft by positioning said energy device on the floor of said aircraft and within a frame of said door and attaching said track to a top of said energy device.

2. The method of claim 1 wherein said two axial track sections are initially folded against each other, and are unfolded to form said single track.

3. The method of claim 1 wherein prior to assembling said lift apparatus, said lift apparatus is removed from a storage location on said aircraft and upon completion of lifting said one or more passengers, said lift apparatus is disassembled, the two or more tracks are folded and the lift apparatus is restored on said aircraft for use at a destination of said aircraft.

4. Portable lift apparatus adapted to be assembled at the location of an aircraft, wherein the lift apparatus extends between an airport's tarmac and a door of the aircraft, said lift apparatus comprising:
an axial track extending from said tarmac to said door of said aircraft, said track comprising a plurality of axial track sections hingedly joined together at ends thereof,
trolley apparatus removably attached to said axial track which is adapted to be to be moveable along the length of the track in an upward and downward direction,
a seat removably connected to said trolley apparatus;
an energy device having a first end of a flexible strap attached thereto, a second end of said flexible strap being attached to said trolley, said trolley being moved up and down said track by said energy device via said flexible strap, said trolley apparatus including braking means for stopping movement of said trolley in the event of said strap failing,
said braking means comprising at least one rotatable disc extending upward from a base of said trolley, said at least one disc having sharp teeth at an end thereof, an opposite end of said disc having a shaft extending from said disc, a second end of said strap connected to said shaft, said at least one disc having a rotational center located between said shaft and said disc rotating upon failure of said strap and said teeth forcibly engaging said track and preventing any further motion of said trolley.

5. Portable lift apparatus adapted to be assembled at the location of an aircraft wherein the lift apparatus extends between an airport's tarmac and a door of the aircraft, said lift apparatus comprising:
an axial track extending from said tarmac to said door of said aircraft, comprising a plurality of axial sections at least one of said axial sections having interlocking hinges extending outward from upper and lower ends of said at least one axial section,
trolley apparatus removably attached to said axial track which is adapted to be to be moveable along the length of said track in an upward and downward direction,
a seat removably connected to said trolley apparatus,
an energy device having a first end of a flexible strap attached thereto, a second end of said flexible strap being attached to said trolley, said trolley being moved up and down said track by said energy device via said flexible strap,
said trolley apparatus including a base and vertical sides extending upward from said base, said trolley including braking apparatus for stopping movement of said trolley in the event of said strap breaking,
said braking apparatus comprising at least one rotatable disc located between said vertical sides of said trolley, said at least one disc having sharp teeth at an end thereof, another end of said disc having a first shaft extending from said at least one disc to which said a second end of said flexible strap is connected, said at least one disc having a rotational center located between said first shaft and said teeth such that breaking of the strap releases tension being provided by said strap, said release of tension allowing said at least one disc to rotate about its rotational center and allow said teeth to engage said track and prevent any further motion of said trolley.

6. Portable lift apparatus adapted to be assembled at the location of an aircraft, wherein the lift apparatus extends between an airport's tarmac and a door of the aircraft, said lift apparatus comprising:
a single axial track extending from said tarmac to said door of said aircraft, said single axial track comprising a plurality of axial track sections joined together at ends thereof,
trolley apparatus removably attached to said axial track which is adapted to be to be moveable along the length of the track in an upward and downward direction,
a seat removably connected to said trolley apparatus;
an energy device having a first end of a flexible strap attached thereto, a second end of said flexible strap being attached to said trolley, said trolley being moved up and down said track by said energy device via said flexible strap,
said trolley apparatus including braking apparatus for stopping movement of said trolley in the event of said strap failing,
said braking apparatus comprising at least one rotatable disc, said at least one disc having sharp teeth at an end thereof, another end of said disc having a first shaft extending from said at least one disc to which said a second end of said flexible strap is connected, said at least one disc having a rotational center located between said first shaft and said teeth such that breaking of the strap releases tension being provided by said strap, said release of tension allowing said at least one disc to rotate about its rotational center and allows said teeth to engage said track and preventing any further motion of said trolley.

7. The apparatus of claim 6 wherein the axial sections of said track comprise a channel having a cross sectional configuration of a horizontal "U" with an elongated horizontal base, upwardly extending sides and inwardly extending lips on upper ends of said upward extending sides of the channel.

8. The track of claim 7 wherein said "U" shaped channel has a relatively high cross sectional moment of inertia such that each axial section of the track is sufficiently stiff to reduce twisting of said track when said lift apparatus is in operation.

9. The apparatus of claim 5 wherein said track includes three joined axial sections wherein a center section has said interlocking hinges extending out has said interlocking hinges extending outward from upper and lower ends thereof, and at least one adjacent section has at least one end having said upper and lower extending interlocking hinges said two adjacent axial track sections being foldable against each other.

10. The apparatus of claim 6 wherein said seat includes a foot rest, said seat and footrest being horizontally rotational.

11. The apparatus of claim 6 wherein said energy source includes a motor and pulley apparatus attached to a rotational shaft of said motor, said pulley apparatus having an end of said flexible strap attached thereto said strap being wrapped and unwrapped around said pulley apparatus during operation of said lift apparatus.

12. The apparatus of claim 11 wherein said pulley apparatus includes two or more pulleys wherein said pulley apparatus reduces the rotational speed of said motor to slowly raise and lower said trolley during operation of said lift apparatus.

13. The apparatus of claim 6 wherein said aircraft door includes a frame completely surrounding a frontal opening of said door and said energy source is positioned behind said frame of the door at a lower front edge thereof, a top end of said track being connected to a top of said energy source whereby said lift apparatus is noninvasive of said aircraft.

14. The apparatus of claim 13 wherein the connection of said track to a top of said energy source includes means for raising said passenger to a height above the floor of said aircraft for ease of said passenger to sit on and off of said chair.

\* \* \* \* \*